United States Patent
Homma et al.

(10) Patent No.: US 10,634,261 B2
(45) Date of Patent: Apr. 28, 2020

(54) ATTACHMENT STRUCTURE FOR ACTUATOR-SPECIFIC SOLENOID VALVE AND ACTUATOR-EQUIPPED VALVE

(71) Applicant: Kitz SCT Corporation, Tokyo (JP)

(72) Inventors: Katsuhiko Homma, Gunma (JP); Hisanobu Iizuka, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 0 days.

(21) Appl. No.: 16/111,959

(22) Filed: Aug. 24, 2018

(65) Prior Publication Data

US 2019/0063630 A1 Feb. 28, 2019

(30) Foreign Application Priority Data

Aug. 31, 2017 (JP) ................. 2017-167090

(51) Int. Cl.
*F16K 27/00* (2006.01)
*F16K 27/02* (2006.01)
*F16K 31/122* (2006.01)

(52) U.S. Cl.
CPC .......... *F16K 27/00* (2013.01); *F16K 27/0236* (2013.01); *F16K 31/1221* (2013.01)

(58) Field of Classification Search
CPC ............. F16K 27/0236; F16K 31/0236; F16K 31/1221; F16K 27/00; F16K 31/124; F16K 31/08
See application file for complete search history.

(56) References Cited

U.S. PATENT DOCUMENTS

| 2,754,840 | A | * | 7/1956 | Hicks, Jr. | F16K 31/423 137/454.6 |
| 3,175,473 | A | * | 3/1965 | Boteler | F16K 31/1262 92/128 |
| 3,312,446 | A | * | 4/1967 | Koch | F16K 31/1262 251/61.4 |

(Continued)

FOREIGN PATENT DOCUMENTS

| JP | 5054904 | 10/2012 |
| JP | 6166855 | 7/2017 |

*Primary Examiner* — Kevin F Murphy
*Assistant Examiner* — Jonathan J Waddy
(74) *Attorney, Agent, or Firm* — Wenderoth, Lind & Ponack, L.L.P.

(57) ABSTRACT

An attachment structure for an actuator-specific solenoid valve and an actuator-quipped valve. The attachment structure can be easily applied to or released from any actuator and a solenoid valve, and the solenoid valve can be easily attached to and removed from any position in a side-surface circumferential direction without impairing compactability of the actuator. The attachment structure for an actuator-specific solenoid valve includes a base body provided on a lower part of a cylindrical actuator and an attachment member removably attachable externally from a main body of the actuator, the attachment member having a fixing part formed as being extended at a position close to a side surface of the main body of the actuator and a solenoid valve for fluid control attached to the fixing part, and the attachment member fixing the solenoid valve being provided rotatably about a side surface of the main body of the actuator.

4 Claims, 5 Drawing Sheets

(56) References Cited

U.S. PATENT DOCUMENTS

| | | | | |
|---|---|---|---|---|
| 3,603,559 | A * | 9/1971 | Totten | F16K 31/10 251/129.2 |
| 4,489,756 | A * | 12/1984 | Balz | F16K 3/0263 137/625.33 |
| 4,526,341 | A * | 7/1985 | Thomas | F16K 51/02 251/335.3 |
| 4,683,453 | A * | 7/1987 | Vollmer | H01F 7/1607 335/255 |
| 4,687,017 | A * | 8/1987 | Danko | F16J 15/04 137/312 |
| 4,712,576 | A * | 12/1987 | Ariizumi | F16K 31/003 137/270 |
| 4,840,347 | A * | 6/1989 | Ariizumi | F16K 31/1221 251/63.4 |
| 5,664,759 | A * | 9/1997 | Evans | C23C 16/4401 251/63.5 |
| 5,810,031 | A * | 9/1998 | Evans | C23C 16/4401 137/557 |
| 6,192,912 | B1 * | 2/2001 | Butler | F16K 27/0281 137/15.19 |
| 6,612,538 | B2 * | 9/2003 | Fukano | F16K 7/17 251/63.5 |
| 7,509,972 | B2 * | 3/2009 | Nesbitt | F16K 35/06 137/383 |
| 8,087,641 | B2 * | 1/2012 | Masamura | F16K 27/0236 251/331 |
| 8,985,137 | B2 * | 3/2015 | Burgett | F16K 27/0281 137/315.28 |
| 9,194,509 | B2 * | 11/2015 | Adams | F16K 31/122 |
| 9,765,903 | B2 * | 9/2017 | Kress | F16K 31/126 |
| 2008/0302427 | A1 * | 12/2008 | Watanabe | F16K 31/0613 137/488 |
| 2009/0038690 | A1 * | 2/2009 | Zur | H01F 7/126 137/315.03 |
| 2010/0072410 | A1 * | 3/2010 | Lacasse | F16K 27/0281 251/324 |
| 2010/0090151 | A1 * | 4/2010 | Tanikawa | F16J 3/02 251/331 |
| 2010/0138051 | A1 * | 6/2010 | Glime | F15B 11/036 700/282 |
| 2018/0094740 | A1 * | 4/2018 | Aoyama | F16K 31/02 |

* cited by examiner

ATTACHMENT STRUCTURE FOR ACTUATOR-SPECIFIC SOLENOID VALVE AND ACTUATOR-EQUIPPED VALVE

BACKGROUND OF THE INVENTION

Field of the Invention

The present invention relates to attachment structures for actuator-specific solenoid valves and actuator-equipped valves and in particular an attachment structure for an actuator-specific solenoid valve and an actuator-equipped valve exceptionally suitable for ALD process.

Description of the Related Art

In recent years, as semiconductor manufacture process, the introduction of ALD (Atomic Layer Deposition) process has been developed. In the ALD process, in an atmosphere at high temperatures (approximately 200 degrees Celsius), gases of a plurality of types such as a precursor, an inert gas, and an oxidizing species gas are alternately supplied from a gas supply system to a chamber by high-speed switching of an extremely short cycle, and atomic layers are homogeneously and uniformly stacked one by one at a nano level on a wafer in the chamber to form a thin film. As a valve for use in this gas supply system, in view of advantages in air operation and valve characteristics and so forth, a direct diaphragm valve including a pneumatic actuator is often adopted.

On the other hand, in the above-described valve open/close operation (air pressure operation by the actuator), a solenoid valve for switching a compressed air flow path with excitation of the solenoid by electrification is interposed between an air supply source for supplying compressed air and the actuator, and air operation is often performed by this solenoid valve. Generally in this case, the solenoid valve is connected via a long air ductwork such as an air tube at a position away from the actuator (cylinder), and the actuator and the solenoid valve are separately and individually configured away from each other.

With the interposition of the long air ductwork linking between the actuator and the solenoid valve, a loss occurs in time by a volume in this long ductwork until the operation air reaches the actuator, thereby degrading responsivity of the actuator with respect to switching operation of the solenoid valve. It particular, this problem is significant in the ALD process in which extremely high quick reaction is required with high-speed switching and also the gas flow rate per switching is small.

By contrast, Japanese Patent Nos. 5054904 and No. 6166855 are suggested as prior arts in which an air operated actuator (cylinder) and a solenoid valve for switching this actuator are made into an integrally adjacent and integrated structure via a predetermined solenoid valve attachment structure, thereby minimizing or eliminating a ductwork distance provided therebetween, improving responsivity between the actuator and the solenoid valve and valve maintainability and, in particular, providing favorable characteristics to the ALD process.

Japanese Patent No. 5054904 (refer to FIG. 1 and paragraph 0036) discloses a diaphragm valve including an attachment structure in which for the purpose of enhancing responsivity of open/close operation of a valve by more decreasing a space part of a fluid passage for driving, a solenoid valve for controlling circulation of a fluid (air) for driving to be supplied into a pneumatic actuator is directly fixed to the upper surface of the actuator to eliminate an air ductwork.

Japanese Patent No. 6166855 discloses an attachment structure for an operation-specific solenoid valve for supplying an operation fluid. In this suggested attachment structure, with an attachment screw in a predetermined structure having an inner flow path, an attachment block in a predetermined structure can be directly fixed via a seal member to an operation port which is open to a cylinder upper surface side, thereby closely fixing the solenoid valve on the cylinder upper surface side.

In addition to the above, there is also a valve product with an attachment structure capable of rotatably fixing a solenoid valve to a side surface of an actuator via a fixture for fixing the solenoid valve to the actuator.

BRIEF SUMMARY OF THE INVENTION

However, in Japanese Patent No. 5054904, since the solenoid valve is fixed to the upper surface of the actuator, the overall height of the actuator is greatly increased, thereby significantly impairing compactability as a valve or gas supply system or a semiconductor manufacturing device. In semiconductor manufacturing devices for which integration and compactability have been increasingly demanded in recent years, an increase in overall height to a degree of the height of the solenoid valve can be an extremely crucial drawback. Moreover, on the upper surface of the actuator of this type, an open/close sensor which senses opening/closing of a piston or the like is often required. In this case, since the sensor or the like and the solenoid valve are integrated together on the upper surface of the actuator, there is no flexibility at all in the attachment position, the direction and the orientation of the solenoid valve when attached, thereby significantly impairing usability of the actuator and making it impossible to use the actuator depending on the condition.

Also, with reference to the fixing structure of the solenoid valve and the upper surface of the cylinder in Japanese Patent No. 5054904, a dedicated fixing structure is required which can directly fix both of the solenoid valve side and the cylinder side in a communication state, and thus cost performance, usability, and versatility as a product are quite low. For example, when any solenoid valve selected from commercially available ones is fixed to the cylinder at appropriate time, a unique structure for fixing both of the solenoid valve and the cylinder has to be processed and formed, thereby inviting an enormous increase in cost and extremely decreasing flexibility in the direction of attaching the solenoid valve. Moreover, replacement by a solenoid valve with a connection of a different type cannot be made, and thus maintainability is also low. In addition, returning to the normal structure after process cannot be made.

Similarly, in Japanese Patent No. 6166855, the solenoid valve is fixed to the upper surface of the actuator with the occupied space as it is, and therefore the above-described problems also occur. Furthermore, in the attachment structure of Japanese Patent No. 6166855, attachment screws and attachment blocks necessary as dedicated components have an extremely complex and special structure. Requirement of these components extremely deteriorate cost performance and productivity as a product, and the structure may not be able to be used depending on the user conditions of the solenoid valve and the product. Still further, while the suggested structure is such that the fixed solenoid valve is rotatable with respect to the actuator, a structure to achieve this is also quite special and complex.

On the other hand, a bracket (fixture) provided to the above-described product is configured to be completely incorporated in advance in the actuator and the valve having the actuator mounted thereon, and is, not configured to be attachable to and detachable from the actuator and the valve. Therefore, every time this fixture (solenoid valve) is retrofitted to or removed from a normal actuator, it is required to disassemble the actuator to attach or remove the fixture. Thus, convenience is quite low as a solenoid valve attachment structure, and maintainability of the actuator is impaired.

That is, as for the above-described product, when the solenoid valve is retrofitted or replaced, disassembling operation is required, such as once removing the actuator and the valve. However, the operation of retrofitting the solenoid valve at the site is often difficult and burdensome, and there is a possibility of requiring an action such as removing the entire actuator-equipped valve from the installation site. Moreover, while the actuator and the valve as being assembled are often subjected to some adjustment such as stroke adjustment of the valve body, this adjustment may go wrong once they are dissolved, and they may become unusable. Thus, when the solenoid valve in the above-described product is replaced, there is a possibility of requiring adjusting operation and so forth in addition to disassembling operation, there possibly significantly degrading workability.

The present invention has been developed to solve the above-described problems, and has an object of providing an attachment structure for an actuator-specific solenoid valve and an actuator-equipped valve, in which a solenoid valve can be easily attached to or detached from any actuator-equipped valve as being intact, the whole is extremely simply configured, and the solenoid valve can be easily attached to and removed from any position in a side-surface circumferential direction without impairing compactability of the actuator or taking up space.

To achieve the above-described object, one aspect of the present invention is directed to an attachment structure for an actuator-specific solenoid valve, the structure comprising a base body provided on a lower part of a cylindrical actuator and an attachment member removably attachable externally from a main body of the actuator, the attachment member having a fixing part formed as being extended at a position close to a side surface of the main body of the actuator and a solenoid valve for fluid control attached to the fixing part, and the attachment member fixing the solenoid valve being provided rotatably about a side surface of the main body of the actuator.

Another aspect of the present invention is directed to an attachment structure for an actuator-specific solenoid valve, the structure including a base body provided on a lower part of an actuator and an attachment member removably attachable externally from a main body of the actuator, the attachment member having a fixing part formed as being extended at a position close to a side surface of the main body of the actuator and a solenoid valve for fluid control attached to the fixing part, the attachment member being a member having an L-shaped cross section formed of an attachment part with an insertion groove and a fixing part, and a holding part formed on an axial attachment part of the base body being inserted into the insertion groove to hold the attachment member by the base body.

Still another aspect of the present invention is directed to the attachment structure for the actuator-specific solenoid, in which a bolt is screwed from below the attachment part toward an annular groove formed in a lower surface of the base body to make the attachment member rotatable without disconnection.

Yet another aspect of the present invention is directed to the attachment structure for the actuator-specific solenoid valve, in which a washer is interposed between the fixing part and the solenoid valve when the solenoid valve is bolted to the fixing part.

Yet another aspect of the present invention is directed to an actuator-equipped valve with the attachment structure for the actuator-specific solenoid valve applied to a valve for fluid control.

Yet another aspect of the present invention is directed to the actuator-equipped valve, in which the valve is an ALD valve.

According to one aspect of the present invention, the attachment member for attaching the solenoid valve can be attached, as it is, to the actuator mounted on the valve. On the other hand, when the solenoid valve is detached, the valve and the actuator can be detached as they are without being disassembled. Therefore, compared with the prior arts, very high maintainability can be provided. Furthermore, the solenoid valve can be installed at any position on the circumference of the side surface of the actuator, and can thus be compactly provided without taking up space.

According to another aspect of the present invention, attachment can be made only by inserting the plate-shaped attachment member having a substantially L-shaped cross section into the lower surface of the actuator for easy handling. Also, it is possible to attach the attachment member for attaching the solenoid valve, as it is, to the actuator mounted on the valve. On the other hand, when the solenoid valve is detached, the valve and the actuator can be detached as they are without being disassembled. Therefore, compared with the prior arts, very high maintainability can be provided.

According to still another aspect of the present invention, the attachment member can be rotatably and reliably installed without disconnection only with a bolt being screwed thereinto.

According to yet another aspect of the present invention, since the washer is interposed between the attachment member and the solenoid valve to allow reliable attachment, the area of contact between the attachment member and the solenoid valve can be reduced to a minimum. Therefore, for example, when the valve is heated, heat transmitted from the attachment member to the solenoid valve can be reduced as much as possible, contributing to durability of the solenoid valve.

According to yet another aspect of the present invention, the attachment structure for the actuator-specific solenoid valve is applied to a valve for fluid control. Therefore, for example, when the attachment structure is applied to a pneumatic-actuator-equipped diaphragm valve, a durable actuator-equipped valve with ease of handling can be provided.

According to yet another aspect of the present invention, in particular, an ALD valve excellent in responsivity, conforming to high-temperature specifications, keeping a stable and reproducible flow rate, and also excellent in durability can be acquired.

DETAILED DESCRIPTION OF THE INVENTION

Figure 1:
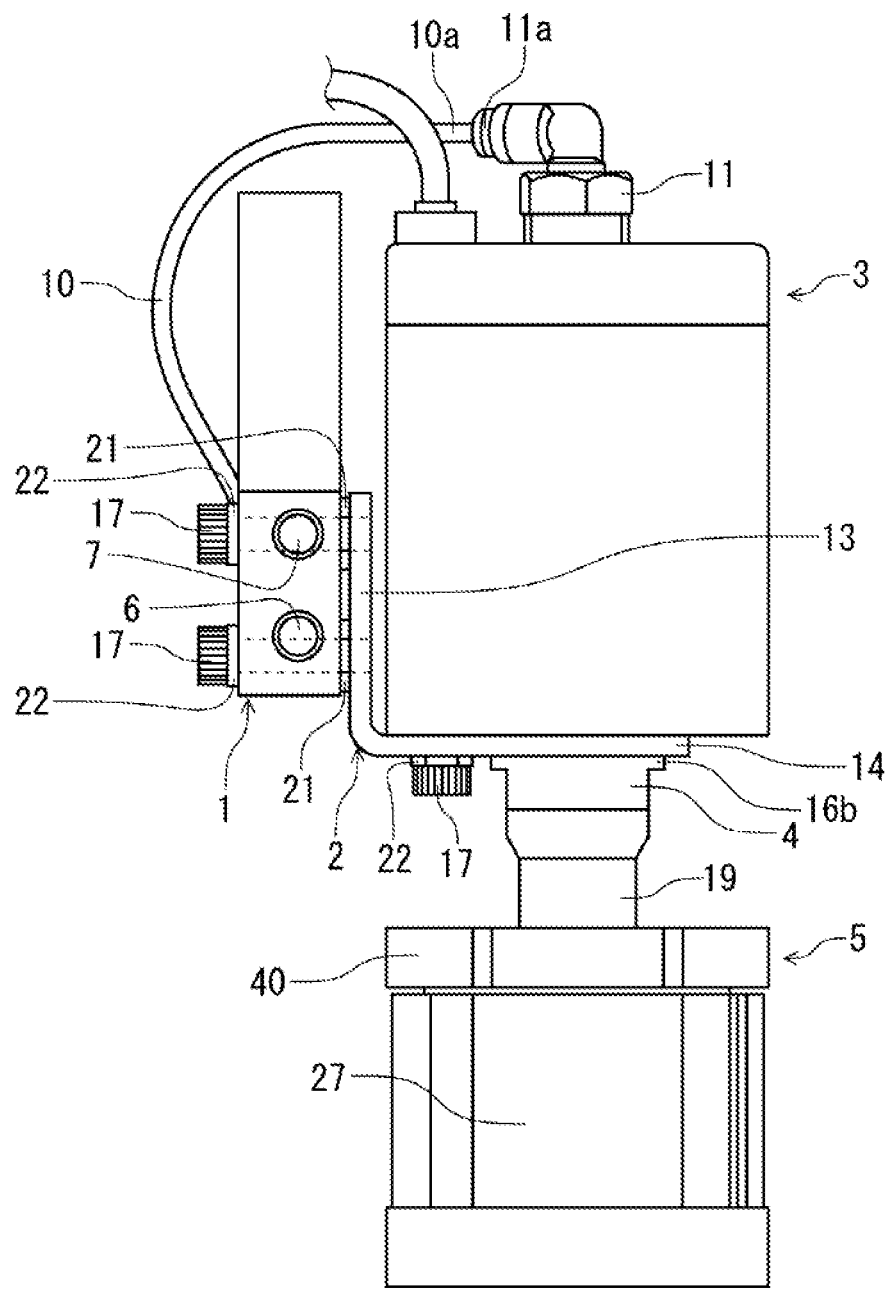
FIG. 1 is a front view of an actuator-equipped valve of the present invention.
Figure 2:
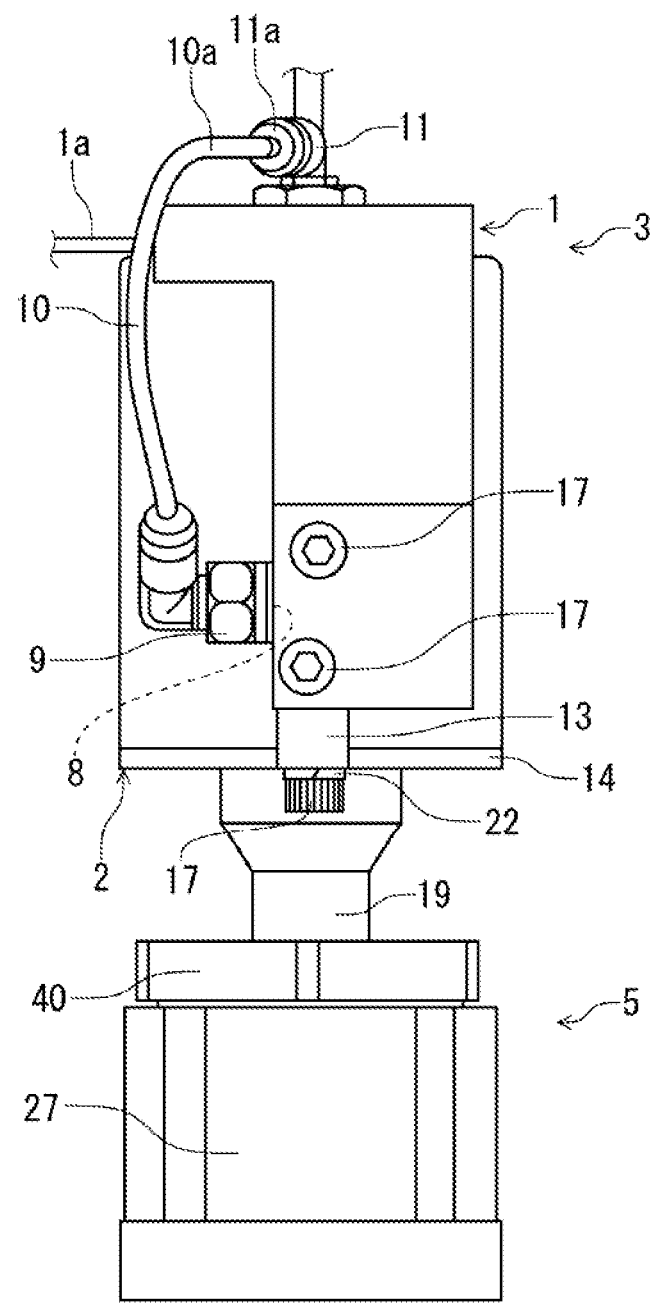
FIG. 2 is a side view of FIG. 1.
Figure 3:
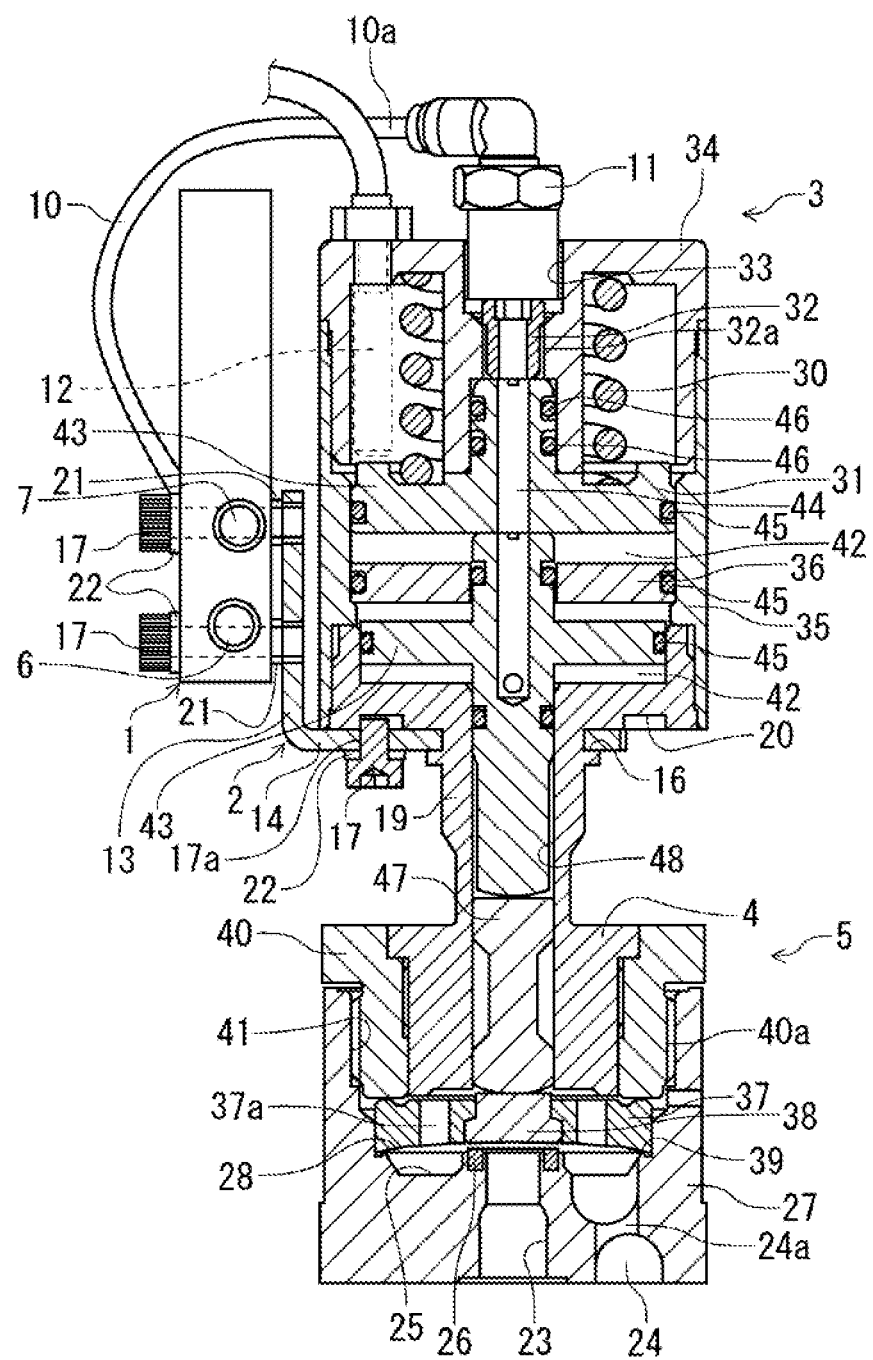
FIG. 3 is a longitudinal sectional view of FIG. 1.

In the following, the structure of a specific embodiment (example) of the present invention is described in detail with reference to the drawings. FIG. 1 is a front view of the external appearance of an actuator-equipped valve of the present example in a state in which a solenoid valve 1 is fixed to complete attachment of an attachment member 2. FIG. 2 is a side view of FIG. 1 viewed from a left side. FIG. 3 is a longitudinal sectional view of FIG. 1 cut at an axial center position of an actuator main body 3, depicting a valve full-open state.

As depicted in FIG. 1 and FIG. 2, in the actuator-equipped valve of the present example, the pneumatic actuator main body 3 including a base body 4 of the present example on a lower part and having an external appearance in a substantially cylindrical external appearance is mounted on a valve main body 5 of the present example, and the attachment member 2 of the present example is attached to the base body 4. Also, as depicted in FIG. 3, the valve main body 5 of the present example is a direct-touch type diaphragm valve in which a metal diaphragm 28 is directly seated on a valve seat 26. The actuator main body 3 has a housing configured of a cylinder 34, a casing 35, and the base body 4, and is provided therebelow with the valve main body 5 having a valve body 27 via a nut 40. However, the external appearance of the actuator main body is not limited to be in a cylindrical shape, and an actuator main body having an external appearance in any shape can be used. Specific structure and operation of the actuator main body 3 and the valve main body 5 will be described further below.

In FIG. 1 to FIG. 3, the solenoid valve 1 is the one for operating, a pneumatic actuator in the present example, although not limited thereto. The solenoid valve 1 has a compact form fitting in a substantially rectangular plate shape as a whole, and is interposed as being connected between an air supply source side (air cylinder) not depicted and the actuator main body 3 via an air ductwork. The solenoid valve 1 has a function of controlling supply (or exhaust) of compressed air to the actuator main body 3 by energisation which causes an inner solenoid valve not depicted to operate to switch open/close of a flow path of the air ductwork as appropriate under predetermined control bar control means such as a speed controller. In FIG. 2, 1a denotes a power supply cable for supply current to the solenoid valve 1.

As depicted in FIG. 1, an input port 6 and a discharge port 7 connected to the air supply source side not depicted are open to, a side surface of the solenoid valve 1. As depicted in FIG. 2, an output port 8 is open to an opposite side surface via the inside of the main body of the solenoid valve 1 where air flow path switching is performed. To this output port, one end of a supply line 10 (resin-made transparent tube) is connected via a coupling 9. Another end 10a of this supply line 10 is connected to the coupling 11 at a minimum distance. This coupling 11 is coupled to a connection part 33 open to an upper surface side of the actuator main body 3, allowing compressed air to be supplied (or exhausted) as appropriate to air chambers 42 inside the actuator main body 3, as will be described further below.

In FIG. 1 and FIG. 2, when the coupling 11 is a universal joint (elbow) rotatable about the axial center of the actuator main body 3 as being in a connected state, the attachment member 2 as having the solenoid valve 1 being attached thereto is rotatable about the actuator main body 3, as will be described further below. Therefore, with the combination of these, the attachment position of the solenoid valve 1 can be suitably adjusted at any side surface position completely freely without being restricted even by the direction of the coupling 11. More suitably, for example, if the end of the supply line 10 can be connected with one-touch operation and the connection can be released by pressing a release ring 11a, handling and usability of the attachment structure of the present invention are enhanced more.

Also, as depicted in FIG. 3, a proximity sensor 12 which can sense valve opening/closing is connected to an upper surface side of the actuator main body 3. A lower end of the proximity sensor 12 is provided so as to be able to be in the proximity of the upper surface of a piston 31 described further below. With the piston 31 approaching, its vertical movements (open/close operation of the valve) can be sensed. With this, data usable for controlling equipment such as the actuator main body 3 and the valve.

Next, the structure of the attachment member 2 is described with reference to FIG. 1 to FIG. 5. Firstly, as depicted in FIG. 1 to FIG. 3, the attachment structure of the present invention includes the attachment member 2 removable attachable externally from the actuator main body 3. This attachment member 2 has a fixing part 13 formed being extended at a position close to the side surface of the actuator main body 3 and the solenoid valve 1 for fluid control attached to this fixing part 13.

As described above, as the fixing pan 13 of the present invention, any part that can attach and fix the, solenoid valve 1 and is formed as being extended at a position close to the side surface of the actuator main body 3 can be selected in accordance with implementation. With this structure, the solenoid valve 1 in a fixed state can be integrated in a compact manner in a space not on the upper surface side where the proximity sensor 12 or the like is present to possibly restrict the fixed position but on the side surface side of the actuator where there is often enough space to effectively utilize foot space and reduce an increase in the entire occupying volume, thereby avoiding an increase in overall height and size of the actuator.

The attachment structure for the actuator-dedicated solenoid valve includes a base body provided on a lower part of a cylindrical actuator and an attachment member removably attachable externally from a main body of the actuator. Therefore, the attachment structure that can be quite easily applied to any of actuators of various types provided with a base body can be configured. Also, since the attachment member is removably attachable externally from the actuator, only removal of this attachment member can quite easily release this attachment structure from the actuator to be returned to an actuator structure of normal specifications, thereby enhancing convenience as an attachment structure.

Figure 4:
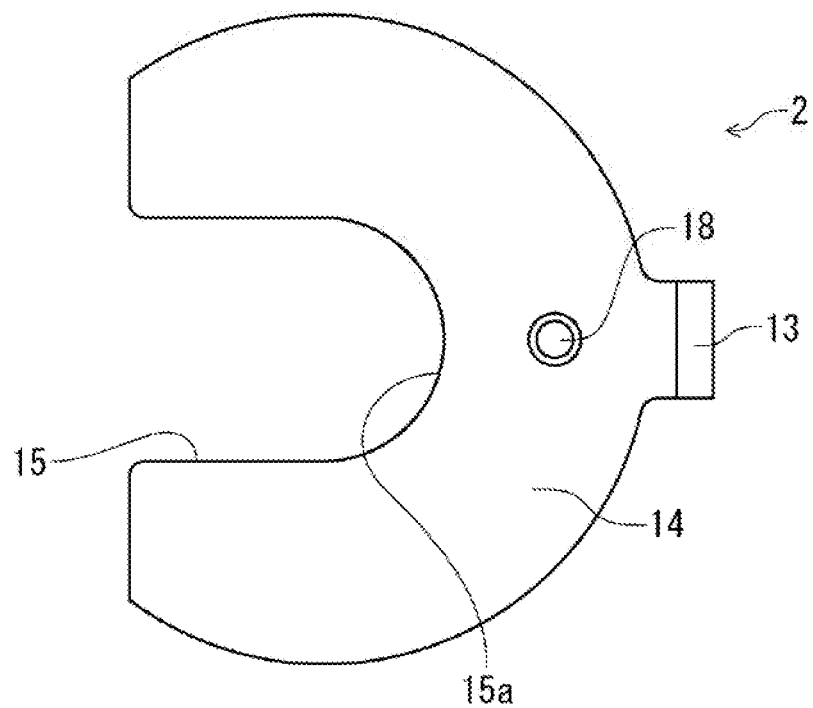
FIG. 4 is a bottom view of an attachment member of the present invention.
Figure 5:
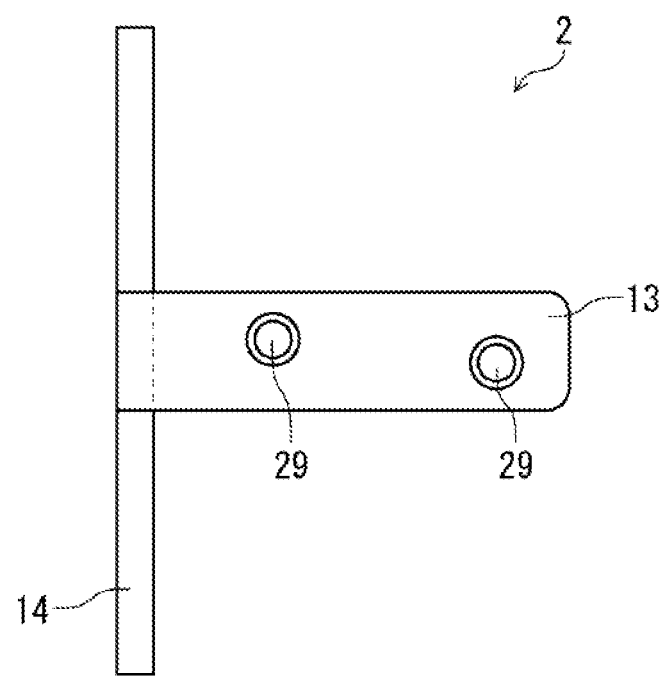
FIG. 5 is a side view of FIG. 4.

FIG. 4 and FIG. 5 depict a specific structure of the attachment member 2 of the present example. The attachment member 2 of the present example is a member having an L-shaped cross section formed of a disc-shaped attachment part 14 having an insertion groove 15 and the fixing part 13. FIG. 4 is a bottom view of the attachment member 2 of the present example when viewed from its bottom surface, and FIG. 5 is a right side view of FIG. 4 when viewed from the right. The outer shape of the attachment part 14 is not limited to a disc shape, any shape can be selected in accordance with implementation, for example, a polygonal shape such as a quadrilateral shape or rectangular shape. In view of compactization, however, the attachment part 14 is preferable formed in a shape and size in accordance with the external appearance of the actuator.

In FIG. 4, the bottom surface of the attachment member 2 of the present example, serves as the attachment part 4 formed in a thin disc shape. At the axial center position, the insertion groove 15 is formed in a notched shape to assume a substantially U shape. As will be described further below, in order to be able to rotatably fit in to be fixed to a holding part 16 of the base body 4 as appropriate, this insertion groove 15 has an inner diameter part 15a formed in a circular shape having a diameter substantially equal to that of an outer circumferential part 16a of a holding part 16 on a depth side formed to have a substantially circular cross section. Also, the thickness of at least a portion of the attachment part 14 near the insertion groove 15 is formed to be substantially equal to the groove width of the holding part 16. However, it goes without saying that this structure can be formed as appropriate in accordance with implementation. Also, as will be described further below, a hole part 18 into which a hexagon socket bolt 17 can be inserted and screwed is formed at one location at the axial center position. A plurality of such hole parts 18 may be formed in accordance with implementation and, for example, three hole parts 18 in total may be provided at symmetrical positions.

In FIG. 5, the side surface of the attachment member 2 of the present example serves as the fixing part 13 formed in a thin rectangular plate shape. As will be described further below, the fixing part 13 is provided with two hole parts 29 into which two bolts 17 that can fix the solenoid valve 1 by insertion can be inserted. These hole parts 29 are also provided as appropriate in accordance with implementation. As depicted in FIG. 5, the fixing part 13 of the present example is connected substantially in a right angle direction with respect to the attachment part 14 and FIG. 3 is a longitudinal sectional view of a state in which this attachment member 2 is attached to the actuator main body 3. As depicted in FIG. 3, the attachment member 2 of the present example has a substantially L-shaped cross section. Thus, even in a state in which the attachment structure of the present example is attached to the actuator, the solenoid valve 1 can be integrated in a very close state, with excess space hardly occurring at a position on the side surface of the actuator main body 3.

Also, in the attachment member 2, the fixing part 13 and the attachment part 14 are not required to be integrally formed of a single member, and can be configured in any manner in accordance with implementation. For example, the fixing part 13 and the attachment part 14 may be each formed of a separate member in a flat plate shape, and then coupled by welding or screws to form the attachment member 2 having a substantially L-shaped cross section.

Next, the structure of the base body 4 of the present example is described with reference to FIG. 1 to FIG. 3 and FIG. 6. The base body of the present invention is provided on a lower part of a cylindrical actuator, and is a portion positioned at least a bottom surface part of the actuator main body (cylinder part or casing part). In the present example, as depicted in FIG. 1 to FIG. 3 and FIG. 6, the attachment member 2 can be held to the base body 4 by inserting the annular holding part 16 formed on an axial attachment part 19 into the insertion groove 15 of the attachment member 2.

FIG. 6A is a longitudinal sectional view of the base body 4 of the present example, and FIG. 6B is a sectional view of FIG. 6A along an A-A line. The base body 4 of the present example is a member incorporated in the base surface part of the actuator main body 3, with an upper side formed in a cylindrical shape having a diameter substantially equal to that of the casing 35 and formed with a male screw that can be screwed and fastened to a female screw on a lower part of the casing 35 and with a lower side formed with a male screw that can be screwed and fastened to a female screw formed on the inner circumferential side of the nut 40. At an axial center position at the center of the base body 4, an attachment hole 48 is open, which is formed in a vertically-elongated shape and is vertically slidable with a rod 47 as a stem fitted thereinto.

Furthermore, as thermal insulation measurements against a high-temperature fluid, an axial attachment part 19 between the lower part side and the upper part side is provided in a bottleneck shape to decrease the cross-sectional area to decrease thermal conductivity therebetween.

As depicted in FIG. 6A, in the present example, the annular holding part 16 is formed at an upper end position of the axial attachment part 19 of the base body 4. The holding part 16 of the present example is an annular groove having the outer circumferential part 16a defined by an annular flange part 16b and having the outer circumferential part 16a on the depth side. To this groove, the insertion groove 15 of the attachment member 2 can be fitted and attached. Also as depicted in FIG. 6A and FIG. 6B, an annular groove 20 is concentrically formed on the lower surface of the base body 4. This annular groove 20 serves as a screw escape groove for the bolts 17, since the diameter, groove width, and depth of this annular groove 20 are set as appropriate in accordance with the position of the hole parts 18 of the attachment part 14 and the bolts 17 to be inserted into these hole parts 18. As depicted in FIG. 6B, a recessed part 19a for clamping the axial attachment part 19 is formed as being notched in a two-surface shape. As will be described further below, the outer shape of the holding part 16 (outer circumferential part 16a) is not limited to an annular shape, but any shape can be selected in accordance with implementation.

As described above, the attachment member 2 of the present example has a quite simple structure as a whole. In particular, when the attachment member 2 is a single member (made of SUS304), the attachment member 2 can be easily formed and processed. Thus, productivity of this attachment structure and convenience when applied to the actuator can also be significantly enhanced. Furthermore, usability and maintainability after application is significantly favorable, and the range of applicable actuators is quite wide. Also, since this attachment member 2 is held by the base body 4, even in a use state with the solenoid valve 1 fixed, the stress from the attachment member 2 is received by the holding part 16 (base body 4) via the insertion groove 20, and thus the stress is not loaded directly onto an actuator main body 3 side via the solenoid valve 1 and the attachment member 2. Therefore, damage on the actuator can be avoided to enhance valve stability.

The solenoid value may be required to be attached afterward, for example, only the solenoid valve becomes out of order and is required to he replaced, or the solenoid valve not initially attached is required after delivery. In particular, in an ALD valve in which operation is performed exceptionally many number of times as tens of millions of times, replacement of only the solenoid valve often occurs. Also in this case, according to the above-described attachment structure for the actuator-specific solenoid valve of the present invention, only the structure of the actuator (the holding part and the annular groove) are of a common structure of the valve, and the solenoid valve can thereby be quite easily attached and detached only with a simple fixture to the valve having attached thereto the actuator. Thus, the solenoid valve can be easily and quickly attached and removed at the site without removing the actuator-equipped valve itself from the installation site.

Also, in valve manufacture, an operation test of the actuator-equipped valve may be performed. At that time, if the fixture and the solenoid valve are left fixed to the actuator, these members may obstruct the test operation or inadvertently make contact with another member to cause damage and failure. By contrast, according to the above-described attachment structure for the actuator-specific solenoid valve of the present invention, the fixture and the solenoid valve can be quite easily retrofitted. Therefore, by attaching or removing the fixture and the solenoid valve as appropriate in accordance with the test, risks of damage and failure before shipment can also be reduced.

Furthermore, according to the attachment structure for the actuator-specific solenoid valve of the present invention, quite advantageous effects can be provided compared with a product configured with the bracket (fixture) completely incorporated in advance into the actuator and the actuator-equipped valve. For example, as described above, in retrofitting, replacement, and so forth of the solenoid valve, not only the attachment operation or the like itself is facilitated, but also adjustment of the valve and the actuator again is not required.

Next, the operation (operation procedure) of the present example including the attachment member 2 and the base body 4 is described.

In the present example, firstly, when the solenoid valve 1 is bolted to the fixing part 13, a washer 21 is interposed between the fixing part 13 and the solenoid valve 1. FIG. 1 depicts the state in which the solenoid valve 1 is attached to the fixing part 13 via this washer 21. In the present example, two flat washers made of stainless steel and stacked for each bolt 17 are used as the washer 21, and two bolts 17 are used to attach the solenoid valve 1 to the fixing part 13. Alternatively, for example, the washer 21 may be made of resin, and any washer can be selected in accordance with implementation. Between each of the two bolts 17 and the side surface of the solenoid valve 1, one spring washer 22 is interposed.

Even if high temperatures are transmitted from the base body 4 side for some reason to increase the temperature of the attachment member 2 to a degree not allowable by the solenoid valve 1, the washer 21 interposed between the fixing part 13 and the solenoid valve 1 can effectively decrease the contact area, thereby attenuating or blocking heat conduction to appropriately reduce the amount of heat flowing into the solenoid valve 1 to allow the solenoid valve 1 to be easily protected against heat. Furthermore, this washer 21 can stop looseness of the bolt 17 fastening the solenoid valve 1 to the fixing part 13.

Next, the attachment member 2 having this solenoid valve 1 attached thereto is attached to the actuator main body 3. Here, the holding part 6 of the base body 4 is inserted into the insertion groove 15 of the attachment part 14 to make the base body 4 hold the attachment member 2. In this holding state, as described above, the outer circumferential part 16a and the inner diameter part 15a are rotatably formed in contact with each other, and the groove width of the holding part 16 is formed in accordance with the thickness of the attachment part 14 so that the holding part 16 is rotatable. Therefore, the attachment part 14 becomes in a state of appropriately fitting in the holding part 16, and the attachment member 2 is in a state of being rotatable about the side surface of the base body 4 (the actuator main body 3). More specifically, with the attachment part 14 being placed on the flange part 16b, the insertion groove 15 is rotatable as sliding about the outer circumferential part 16a. Here, the attachment member 2 is favorably formed to fit so as to stably rotate without backlash (play).

Next, the bolt 17 is screwed toward the annular groove formed on the lower surface of the base body 4 from below the attachment part 14, thereby making the attachment member 2 rotatable without disconnection. As described above, the annular groove 20 is formed in the lower surface of the base body 4 in accordance with the position in accordance with the hole part 18 of the attachment part 14. Therefore, in the above-described holding state, when the bolt 17 is screwed into the hole part 18, a screw part 17a of the bolt 17 is accommodated as protruding inside the annular groove 20, thereby locking the disconnecting operation of the attachment part 14. Thus, the attachment member 2 fixing the solenoid valve 1 is provided rotatably about the side surface of the actuator main body 3. Here, if the attachment part 14 is configured so that the diameter of the screw part 17a is set to be close to the groove width of the annular groove 20 as much as possible or the screw part 17a in the holding state is at a position close to the outer diameter side as much as possible, backlash of the screw part 17a can be favorably stopped inside the annular groove 20 even if the attachment part 14 performs operation in a disconnecting direction (operation in a horizontal direction in FIG. 1 to FIG. 3). Also, the bolt 17 that is slightly long may be used to allow the screw part 17a to make contact with the depth side of the annular groove 20 when screwed into the hole part 18 to stop rotation of the attachment member 2 by screwing. Here, the spring washer 22 is used also for the bolt 17.

In the present example, the bolt 17 is screwed as fixing means from below the attachment part 14 toward the annular groove 20, thereby allowing rotation but preventing disconnection of the attachment member 2. Any means that can restrict movement of the attachment member 2 to a sideward direction (horizontal direction) by protruding inside the annular groove 20 can also be selected as this fixing means in accordance with implementation. For example, although not depicted, a pin may be used for locking, or a protrusion may be provided on an upper surface side of the attachment part 14 for locking.

As described above, the rotation structure of the attachment member of the present invention can be very simply configured. Therefore, processability and cost performance are high when the structure is applied to an actuator, the range of actuators to be processed is wide. Furthermore, since disconnection can be prevented (or rotatable fixation can be made) only with one bolt, an attachment structure with quite favorable handling usability and maintainability can be provided.

Finally, the other end 10a side of the supply line 10 connected to the output port 8 if the solenoid valve 1 in advance and becoming in an open end state is connected to the coupling 11. As described above, if the coupling 11 is a one-touch-type universal joint, the coupling can be freely adjusted to any rotating direction, and the position on the side surface of the solenoid valve 1 can be freely adjusted. Therefore, the positions of the solenoid valve 1 and the entire supply line 10 connected thereto can be adjusted to any position on the side surface. Also, the supply line 10 can be easily removed and attached. Thus, convenience is significantly improved, and it is possible to provide an attachment structure for an actuator-specific solenoid valve with a wide range of application and high versatility and usability.

Normally, the solenoid valve 1 is attached to a position close to the actuator main body 3 by using the attachment member 2 in the above-described procedure. However, it goes without saying that the procedure is not particularly restrictive, and the processes in the procedure including bolting the solenoid valve 1 to the fixing part 13, attachment of the attachment member 2 attached with the solenoid valve 1 to the actuator main body 3, prevention of disconnection of the attachment member 2, and connection of the supply line 1 to the coupling 11 can be combined in any manner in accordance with implementation.

In the present example, the attachment member 2 fixing the solenoid valve 1 is provided rotatably about the side surface of the actuator main body 3. However, this rotatability is not necessarily required, and the attachment structure of the present invention can also be used when rotation is fixed as described below.

Figure 6:
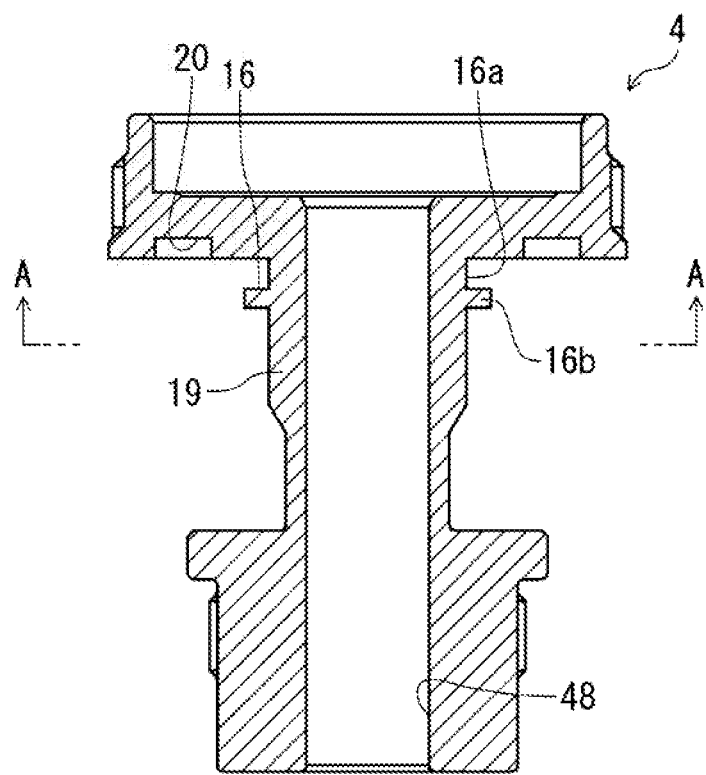
FIG. 6A is a longitudinal sectional view of a base body of the present invention.
FIG. 6B is a sectional view of FIG. 6A along an A-A line.
Figure 6:
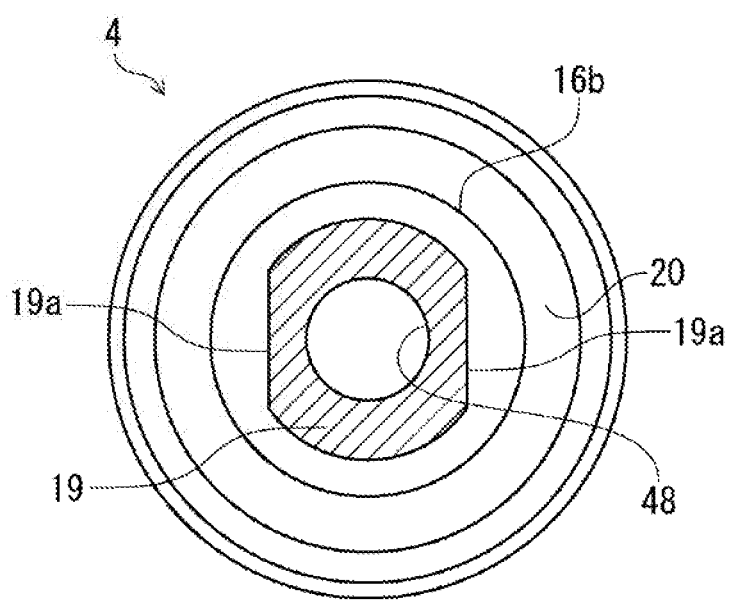

In the present example, as depicted in FIG. 4 and FIG. 6, the outer shape of the attachment part 14 is a circular shape, and the inner diameter part 15a (inner shape of the insertion groove 15) and the outer circumferential part 15a (outer shape of the holding part 16) are both formed in a circular shape for fitting, thereby allowing the attachment part 14 to rotate as being held by the holding part 16. By contrast, when rotation of the attachment member in a held state about the side surface of the actuator is fixed, the inner diameter part 15a (inner shape of the insertion groove 15) and the outer circumferential part 16a may be each formed in a mutually rotation-lockable shape.

For example, although not depicted, when the outer circumferential part has a cross section formed by cutting out a width across flat with respect to a circular shape, the groove width of the insertion groove may be formed so as to match this width across flat. When the outer circumferential part with this width across flat is inserted in the insertion groove, the attachment member can be held by the holding part with rotation about the side surface of the actuator being locked, and the attachment position of the solenoid valve is in two directions at a 180-degree interval with respect to the actuator main body. Similarly, if the outer circumferential part has a hexagonal cross section and is inserted in the insertion groove formed to have a groove width capable of fitting this shape, the attachment member can be held by the holding part with rotation being locked, and the attachment position of the solenoid valve is in six directions at 60-degree intervals with respect to the actuator main body. Furthermore, similarly, if the outer circumferential part has a quadrilateral cross section, the attachment position of the solenoid valve is in four directions at 90-degree intervals with respect to the actuator main body. In any case, after the attachment part is held by the holding part, the direction of the attachment member is not changed. Therefore, this is advantageous when, for example, the solenoid valve is desired to be stably fixed by preventing wobbling.

Furthermore, it is not necessarily required that the insertion direction to the insertion groove 15 and the position of the fixing part 13 be aligned with the same direction as depicted in FIG. 4. For example, although not depicted, the position of the fixing part may be provided as being shifted by 90 degrees or 120 degrees from the insertion direction. This may be advantageous when, for example, the attachment member is inserted and fixed to the actuator main body while avoiding an obstacle around the valve.

Next, the structure and operation of the actuator main body 3 and the valve main body 5 of the present example are described with reference to FIG. 3. In the present example, a valve for fluid control is adopted and, in particular, is quite suitable as an ALD valve.

The valve of the present example is a metal diaphragm valve having the body 27 with a valve chamber 25 communicating a primary-side flow path 23 and a secondary-side flow path 24 provided with a valve seat 26, the metal diaphragm 28 with its center part disposed above the valve chamber 25 vertically moving to make contact with the valve seat 26, and a stem which lowers the center part of the metal diaphragm 28, and a flow-path restriction part 24a is provided to a part of the secondary-side flow path 24.

The actuator main body 3 is mounted on the body 27. In this actuator main body 3, a spring 30 which lowers the stem and the piston 31 which is raised by supply of compressed air are incorporated, and an adjustment screw 32 is provided so as to be able to adjust the ascending amount of this piston 31 by being screwed to serve as stroke adjustment means.

In this adjustment screw 32, with a male screw part 32a screwed into a female screw part, the screwing distance of this screwing can be adjusted. In this screwing, rotation can be made by inserting a wrench into a hold part. Also, an upper end of the piston 31 ascends by air supply to make contact with a lower end of the adjustment screw 32 to restrict an ascent. Thus, by setting the position of the adjustment screw 32 at a maximum stroke position of the piston 31 in accordance with a necessary Cv value of the valve by adjusting screwing, the ascent of the piston 31 can be restricted and the Cv value of the valve can be adjusted. If a supply source is attached to the connection part 33 to supply air to the actuator, supplied air can communicate through a flow path formed by penetrating the axial center position of this adjustment screw 32.

The cylinder 34 has a substantially cylindrical outer appearance, and is provided at the axial center position with the connection part 33 formed of a female screw that can be connected (screwed) to an air supply source externally provided and not depicted. On its depth side, the female screw part is formed that can be screwed to the male screw part 32a of the adjustment screw 32. On its depth side, a cylindrical fit-in part is formed that can fit in the upper part of the piston 31. At a lower end of the cylinder 34, a male screw that can be screwed to a female screw of the casing 35 is provided. Also, inside the cylinder 34, a receiving part for biasing the spring 30 described below is provided so as to be recessed.

The casing 35 is formed to have a cylindrical external appearance having a diameter substantially equal to that of the cylinder 34, having the above-described female screw formed at an upper end and a female screw also formed at a lower end that can be screwed to a male screw at the upper end of the base body 4. Also, on the inner circumferential surface of the casing 35, a step part that can engage and hold a sub-base 36 is formed.

The valve main body 5 is connected to the actuator main body 3 via the base body 4. On the inner circumferential surface side of the body 2, a bonnet 37 which presses the diaphragm 28 to configure an outer periphery seal part is provided. The bonnet 37 is formed in a substantially flat cylinder shape. At the axial center position at the center of the bonnet 37, an attachment hole is open, which can vertically slide with a diaphragm piece 38 fitting thereinto. This attachment hole is provided with a step part corresponding to a flange part of the diaphragm piece 38. Also, a longitudinal hole 37a is also provided in which a jig is inserted at the time of assembling the valve.

The metal diaphragm 28 is formed in a substantially disc shape by using a plurality of stacked SPRON-made diaphragm members. The outer edges of these members are tightly held between a protrusion 39 formed on the outer periphery of the valve chamber 25 of the body 2 and the outer periphery at the lower end of the bonnet 37 to configure an outer periphery seal part.

To assemble the valve of the present example, firstly, the metal diaphragm 28 is placed so that its outer edge is positioned on the protrusion 39. Then, the outer periphery of the lower surface of the bonnet 37 is put on the metal diaphragm 28. With the metal diaphragm 28 vertically interposed, a female screw 41 of the body 27 is lightly screwed to a male screw 40a of the nut 40 so that the lower end face of the nut 40 is in contact with the upper surface of the bonnet 37. Next, member not depicted is attached to the longitudinal hole 37a, the entirety is vertically interposed by a jig not depicted, thereby ensuring a state in which the bonnet 37 is prevented from rotating with respect to the body 27 and the nut 40 by the pin member via the jig. Next, with this rotation-prevented state maintained, the nut 40 is rotated and fastened laterally by a torque wrench. With this, even if the contact force between the nut 40 and the bonnet 37 is increased when fastening almost ends, the nut 40 is prevented from rotating together accordingly. Thus, a kink of the metal diaphragm 28 due to rotation and fastening of the bonnet 37 does not occur, and durability of the metal diaphragm 28 can be improved. In this manner, the outer edge of the metal diaphragm 28 is vertically and tightly pressured by the bonnet 37 and the protrusion 39 to be fixed inside the valve chamber 25 to configure an outer periphery seal part.

Next, the structure of the actuator main body 3 of the present example is described with reference to FIG. 3. The actuator main body 3 is provided with at least two air chambers 42 to ensure an air drive force (valve open force). As depicted in FIG. 3, the sub-base 36 is arranged, and the piston 31 is configured in two steps in a compact manner, thereby providing the air chambers 42.

The piston 31 has two circular-flange-shaped piston parts 43 extending in parallel and a cylindrical extending, part which links the center positions of these piston parts 43. On an upper end face side of the extending part, a flow path is open which can conduct supplied air inside the piston 31 to the axial center direction. In this flow path, a flow path 44 that is open toward the two air chambers 42 and can supply air thereto are formed as being branched. This, when an air supply source is connected to the connection part 33 via the coupling 11 or the like, air from the supply source is conducted through the flow path 44 to the air chambers 42.

The piston part 43 is provided on the outer edge with an FKM-made O ring 45 to seal and slide between the inner circumferential surfaces of the casing 35 and the base body 4. Similarly, O rings 46 are also provided at a plurality of locations of the extending part in the axial direction of the piston 31. Furthermore, an O ring 45 is also provided on the outer edge of the sub-base 36. Two O rings 46 are provided at the upper end of the piston 31 to enhance an effect of reducing a tilt of the piston 31 so as to prevent occurrence of damage and operation failure because the cylindrical extending part vertically moves as being slightly tilted with respect to the axial center direction of the cylinder 34 (the fit-in part) when the piston 31 ascends and descends to rub the inner circumferential surface of the fit-in part.

The rod 47 as a stem is provided so as to be able to vertically slide as fitting in the inner circumferential surface of the attachment hole 48 of the base body 4 almost without resistance, and is made of SUS304 and formed to be vertically elongated. The rod 47 has an upper end face in contact with the lower end face of the piston 31 and a lower end face in contact with the upper end face of the diaphragm piece 38.

Also, when the fluid is at high temperatures such as approximately 200 degrees Celsius and this heat transmission increases the temperature of the actuator, operation failure may occur. When an electronic device such as a sensor is attached, a trouble may occur, for example, the device is out of order due to heat. To make heat from the heated body 27 and so forth difficult to be transmitted to the actuator main body 3, predetermined measures against heat are taken. In the present example, the cross-sectional area of a heat conduction route member through which heat is transmitted from the body 27, the bonnet 37, and so forth as heating members to the actuator main body 3 is decreased within a range not causing a trouble in the functions of the valve and the actuator.

Specifically, to decrease a cross-sectional area in contact with the upper end face of the diaphragm piece 38 that can serve as a heating member due to heat conduction from the fluid at high temperatures, the lower end face of the rod 47 is formed in an arc-shaped curved shape and, similarly, the upper end face of the rod 47 that can serve as a heating member is formed also in an arc-shaped curved shape, thereby decreasing the contact region in contact with the lower end face of the piston 31. This eliminates efficient heat conduction due to a surface contact at least above and below the rod 47. Furthermore, a narrowed part is provided to the axial attachment part 19 of the base body 4, and a constricted part is also provided to the rod 47. With these constricted parts, the cross-sectional area of heat conduction from the body 27 side to the actuator main body 3 side is decreased as much as possible to reduce thermal conductivity.

Next, the operation from a full-open state to a full-closed state of the valve of the present example is described. As described above, FIG. 3 depicts a frill-open state. In the following, the case is described in which air is purged from the air chambers 42 in a full-open state.

In FIG. 3, the air chambers 42 is filled with air, and the piston part 43 is pulled up by this air pressure against the biasing force of the spring 30. On the other hand, the center part of the metal diaphragm 28 is swelled upward by its own shape recovery force. In this swelled state, the diaphragm piece 38 placed on the upper surface of the metal diaphragm 28 and the rod 47 placed on the diaphragm piece 38 are raised together. Also, as described above, the ascent of the upper end of the piston 31 is restricted as being in contact with the lower end of the adjustment screw 32 by adjustment stroke. Thus, the center part of the metal diaphragm 28 is not completely swelled to a natural shape but is slightly recessed.

Next, as air is discharged from the air chambers 42, the upper surface of the piston part 43 is pressed downward by the biasing force of the spring 30. Accordingly, the lower end of the piston 31 presses the upper end face of the rod 47. Accordingly, the lower end face of the rod 47 presses the upper end face of the diaphragm piece 38. Accordingly, the lower surface of the diaphragm piece 38 flexibly deforms the metal diaphragm 28 so as to recess the upper surface of the center part of the metal diaphragm 28. Then, when the diaphragm piece 38 completely descends to cause the center part of the metal diaphragm 28 to fully make contact with the upper surface of the valve seat 26, the valve becomes in a full-closed state, although not depicted.

Operation from this full-closed state to a full-open state is performed in reverse order of the above-described operation. Firstly, air is supplied to the air chambers 42 via the flow path 44 from an air supply source connected to the connection part 33 and not depicted to provide air pressure to the actuator main body 3. By this air pressure, the piston 31 ascends. With this ascent of the piston 31, the rod 47 and the diaphragm piece 38 are released from being pressed by the piston 31, and the shape recovery force of the metal diaphragm 28 becomes available. Accordingly, the center part of the metal diaphragm 28 swells to lift up the diaphragm piece 38 and the rod 47 for ascent. This ascent ends when the upper end of the piston 31 makes contact with the lower end of the adjustment screw 32, and the valve becomes in a full-open state depicted in FIG. 3.

Furthermore, the present invention is not limited to the description of the above-described embodiment, and can be variously modified in a range not deviating from the gist of the present invention described in the claims of the present invention.

What is claimed is:

1. An attachment structure for an actuator-specific solenoid valve, the attachment structure comprising:
    a base body provided on a lower part of a main body of an actuator; and
    an attachment member removably attachable externally from the main body of the actuator,
    the attachment member comprising a fixing part and an attachment part, the attachment part having a hole part and an insertion groove at an axial center position and formed in a notched shape to assume a substantially U shape,
    the fixing part being formed in a plate shape, and the attachment member having the solenoid valve for fluid control attached to the fixing part,
    the attachment member being a member having an L-shaped cross section formed of the attachment part defining the insertion groove and the fixing part, and a holding part formed as an annular outer circumferential groove on an axial attachment part of the base body, the axial attachment part being inserted into the insertion groove to hold the attachment member by the base body, and while the attachment member is being held, a bolt being screwed via the hole part from below the attachment part toward an annular groove formed on a lower surface of the base body,
    the annular groove accommodating a protruding part of the bolt inside the annular groove thereby locking a disconnection operation of the attachment part and the actuator main body.

2. The attachment structure for the actuator-specific solenoid valve according to claim 1, wherein a washer is interposed between the fixing part and the solenoid valve when the solenoid valve is bolted to the fixing part.

3. An actuator-equipped valve with the attachment structure for the actuator-specific solenoid valve according to claim 1 applied to a valve for fluid control.

4. The actuator-equipped valve according to claim 3, wherein the valve is an ALD valve.

* * * * *